United States Patent [19]  [11]  4,209,912
Barker  [45]  Jul. 1, 1980

[54] PROCESS AND APPARATUS FOR THE DRYING OF RESINOUS MATERIALS

[75] Inventor: Henry P. Barker, Lock Haven, Pa.

[73] Assignee: General Electric Company, Pittsfield, Mass.

[21] Appl. No.: 869,527

[22] Filed: Jan. 16, 1978

[51] Int. Cl.² ............................................... F26B 3/08
[52] U.S. Cl. .......................................... 34/10; 34/12; 34/57 R; 432/14
[58] Field of Search ............... 34/10, 12, 57 R, 57 A; 432/14

[56] References Cited

U.S. PATENT DOCUMENTS

| 2,054,441 | 9/1936 | Peebles | 34/10 |
| 2,783,544 | 3/1957 | Bachmann et al. | 34/57 B |
| 3,508,339 | 4/1970 | Neblett et al. | 34/10 |
| 4,070,765 | 1/1978 | Hovmand | 34/57 R |

Primary Examiner—John J. Camby
Attorney, Agent, or Firm—Morgan, Finnegan, Pine, Foley & Lee

[57] ABSTRACT

A novel process for the drying of resinous materials is disclosed which comprises superheating a solution of the resinous material and spraying the superheated solution through one or more venturi shaped nozzles at high pressure in order to provide resultant material in the form of discrete particles having a lowered moisture content. A novel design for a venturi nozzle which may be advantageously employed in carrying out the drying process of the present invention is also disclosed.

9 Claims, 2 Drawing Figures

PROCESS AND APPARATUS FOR THE DRYING OF RESINOUS MATERIALS

This invention provides a novel drying process for forming discrete particles having a lowered moisture content which comprises superheating a solution of the resinous material ans spraying the superheated solution through one or more venturi shaped nozzles at high pressure. This invention also provides a novel venturi nozzle apparatus for carrying out the novel drying process described.

BACKGROUND OF THE INVENTION

The rapid drying of resinous materials via injection of a wet resin solution into a high velocity stream of a hot gas or vapor and expanding same through a nozzle is known in the art and such processes are presently used for the formation of discrete particles of such resinous materials having low moisture content. One example of a drying apparatus and process of the type for which the present invention provides a novel improvement is described by Neblett et al. in U.S. Pat. No. 3,508,339 which issued on Apr. 28, 1970.

In carrying out a rapid drying process for resinous materials, such as polycarbonate resins, it has been found to be generally desirable to employ steam as the hot high velocity vapor medium and to inject the solution of the said resinous material into the high velocity vapor medium at a point downstream of the throat of the nozzle to form a suspension of the resin solution in the hot vapor prior to passing this mixture on to further processing steps to arrive at a segregated solid particulate material having a low moisture content.

It has now been found that in drying solutions of resinous materials, particularly polycarbonate resinous materials via a steam precipitation type process employing an apparatus or processing arrangement similar to that taught in U.S. Pat. No. 3,508,339, the disclosure of which is incorporated herein by reference, or variations of this processing arrangement, it is advantageous to employ a combination of a superheated resin solution and high pressure in order to reduce the quantity of hot high velocity vapor which must be employed, in order to achieve a desired degree of quality in the resultant dry particulate material.

It has also been found that the utilization of a venturi type nozzle wherein the resin solution material is injected into the throat of such nozzle at a discrete angle with relation to the direction of flow of the hot high velocity vapor medium provides for an improved apparatus for carrying out the process of the present invention.

DESCRIPTION OF THE DRAWINGS

The apparatus as shown in

DESCRIPTION OF THE INVENTION

The present invention provides for a novel process for the drying of resinous materials which comprises superheating a solution of the resinous material and spraying the superheated solution through one or more venturi shaped nozzles at high pressure in order to provide resultant material in the form of discrete particles having a lowered moisture content. A novel design for a venturi nozzle which may be advantageously employed in carrying out the drying process of the present invention is also provided for herein.

The process of the present invention is generally applicable to a broad range of resinous materials which are susceptible to drying utilizing a rapid drying process such as that taught by Neblett et al. in U.S. Pat. No. 3,508,339.

The hot high velocity vapor medium which may be suitably employed in carrying out the process of the present invention may be any of a number of materials including air, an inert gas, steam or other similar materials.

Generally speaking, the utilization of a superheated resin solution stream at high pressure in the manner herein described will result in a reduction in the quantity of hot high velocity vapor medium which must be employed in order to affect the drying of a given resin solution to a particular quality of particulate resin having a desired level of moisture content.

It has been found that when the process of the present invention is employed to dry a methylene chloride solution of a polycarbonate resin material utilizing steam as the hot high velocity vapor medium, the polycarbonate methylene chloride solution may be advantageously superheated to a temperature of from about 130° to 300° F. and injected at a pressure of up to 3000 psig.

Under such conditions, it has been found that the rate of drying may be increased relative to the quantity of steam (as the hot high velocity vapor medium) utilized without any appreciable reduction in the quality of the resultant dried resinous material from that which was obtained at lower flow rates utilizing unsuperheated resin solution at lower pressures.

It has also been found that at pressures if up to 325 psig utilizing a standard venturi-type nozzle or multiplicity of such nozzles, having the solution inlet orientated perpendicular to the direction of flow of the hot high velocity vapor medium, suffices in carrying out the process of the present invention. However, at higher resin solution injection pressures, the solution inlet is preferentially orientated at a discrete angle with relation to the direction of flow of the hot high velocity vapor medium.

Figure 1:
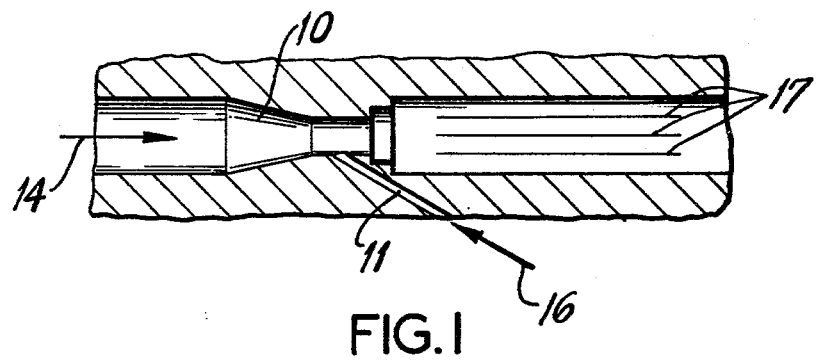
FIG. 1 depicts a cross section of a venturi nozzle showing the location and direction of the resin solution injection inlet.
Figure 2:
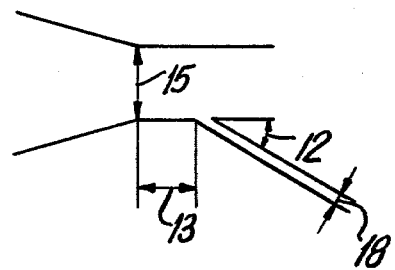
FIG. 2 depicts a schematic of the venturi nozzle of FIG. 1, showing certain dimensional variables.

Referring to FIGS. 1 and 2, the preferred high pressure venturi nozzle arrangement comprises a standard venturi nozzle assembly 10, having a resin injection inlet 11 of a given diameter 18, which is orientated at an angle 12, with relation to the direction of flow of the hot high velocity vapor medium 14, and is located at a distance 13 from the beginning of the throat of such nozzle arrangement, of diameter 15.

The hot high velocity vapor 14, flows into the throat of the venturi, mixes with the superheated high pressure resin solution 16, expanding and forming an intimate mixture therewith 17.

In the above arrangment the angle 12, at which the resin solution is injected into the throat of the venturi may vary between from about 15° to 90° and will preferentially be orientated at an angle of about 30°, for the drying of polycarbonate resin solutions in methylene chloride. The distance 13 from the beginning of the throat of the venturi to the solution injection point may vary depending upon the overall size and configuration of the venturi nozzle, as will the diameter of the venturi nozzle itself.

The diameter 18, of the resin solution inlet will also very depending upon the size of the venturi nozzle and the flow rate of the resin solution.

DESCRIPTION OF THE PREFERRED EMBODIMENTS

The following examples are set forth to further illustrate the present invention and are not to be construed as limiting the invention thereto.

EXAMPLE I—CONTROL

Three samples of polycarbonate resin particles which had been prepared via drying by steam precipitation using conventional processes, i.e. by injecting polycarbonate resin/methylene chloride solution at 130° F. through a venturi nozzle of conventional configuration with the inlet injection point perpendicular to the direction of flow of the hot high velocity steam which was saturated at 170 psig. The results of tests on samples of the dried resin showed the following consistent results:

| | |
|---|---|
| Bulk Density | 12–14 (lbs. ft.$^3$) |
| Particle size distribution | 20 mesh >90% <60 mesh |
| Moisture content | 5–10% |

EXAMPLES II—XXIII

Various samples of polycarbonate resin particles were processed by drying polycarbonate/methylene chloride solutions utilizing steam as the hot high velocity vapor medium and various venturi nozzle(s) having the configurations indicated in Table I, while varying the parameters of steam flow rate, steam pressure, particulate flow rate and resin solution temperature and pressure. The results of density, particle size and moisture analyses performed on these samples are set forth in Table I.

TABLE I

EXAMPLES II–XXIII

| | Steam Rate lb/hr. | Steam P psig | Particulate Rate lb/hr. | Pump Rpm | Resin Soln. T °F. | Resin Soln. P psig | Particle Size - % 20/40/60 Mesh | Density ft.$^3$ | % Moisture | Nozzle Dimensions | Comments |
|---|---|---|---|---|---|---|---|---|---|---|---|
| Ex. II | 1300 | 120 | — | — | 190 | 110 | 6.4/12.6/21.5 58.6% fines | 11.8 | — | FIG. 2 Dimens #12 = 30° #13 = 0" #15 = .210" #18 = .042" | Resin soln. 13.2% (W) 4 venturis |
| | 1270 | 124 | — | — | 175 | 270 | 11.3/20.0/27 38.5% fines | 12.8 | — | same | same |
| | 1200 | 125 | — | — | 160 | 310 | 14.4/26.2/25.9 27.4% fines | 13.2 | — | same | Resin soln. 14% (W) 3 venturis |
| Ex. III | 1100 | 156 | 132 | — | 250 | 300 | 8.3/28.4/24.1 38.1% fines | 12.6 | — | same | same |
| | 550 | 156 | 132 | — | 250 | 300 | 12.6/29.9/18 36.3% fines | 12.8 | — | same | same |
| Ex. IV | 1060 | 160 | 236 | 87 | 265 | 300 | 12.9/40.2/26.9 18.8% fines | 14.3 | — | FIG. 2 Dimens #12 = 30° #13 = 0" #15 = .210" #18 = .042" | Resin soln. 18% (W) 3 venturis |
| | 940 | 160 | 420 | 102 | 225 | 350 | 9.2/25.8/26.3 32.9% fines | 12.8 | — | same | same |
| | 860 | 160 | 520 | 110 | 210 | 380 | 15.6/25.0/15.3 30.4% fines | 14.0 | — | same | same |
| Ex. V | 1100 | 160 | 468 | 85 | 255 | 310 | 14.7/35.9/21.8 24.5% fines | 12.5 | 6.0 | same | Resin soln. 16.8% (W) 3 venturis |
| | 900 | 145 | 300 | 84 | 225 | 310 | 18.9/42.1/21 11.4% fines | 13.1 | 8.0 | same | same |
| | 900 | 145 | 400 | 85 | 220 | 300 | 19.5/36.6/16 13.7% fines | 13.7 | 6.9 | same | same |
| Ex. VI | 1000+ | 140 | 135 | 41 | 250 | 407 | 24.2/15.1/11.1 30.5% fines | 12.1 | — | FIG. 2 Dimens #12 = 30° #13 = 0" #15 = .210" #18 = .042" | Resin soln. 12.3% (W) 3 venturis |
| | 1000+ | 140 | — | 41 | 251 | 405 | 18.5/17.3/19.5 30.7% fines | 13.1 | — | same | same |
| | 1000+ | 140 | 132 | 41 | 255 | 420 | 14.7/14.3/16.2 42.3% fines | 11.7 | — | same | same |
| Ex. VII | 500+ | 151 | 150 | 52 | 250 | 305 | 3.2/5.2/20 73.1% fines | 8.2 | — | same except #18 = .055" | Solids 12.3% (W) 3 venturis |
| | 500+ | 152 | 150 | 52 | 251 | 305 | 5.2/9.9/27.9 55.7% fines | 11.1 | — | same | same |
| Ex. VIII | 495 | 160 | — | 33 | 245 | 420 | 14.8/40.1/22.6 20.4% fines | 9.7 | — | same | Solids 12.3% 2 venturis |
| Ex. IX | 500+ | 168 | 194 | 53 | 245 | 230 | 13.0/40.9/25.6 13.4% fines | 11.0 | — | FIG. 2 Dimens #12 = 30° #13 = 0" #15 = .210" #18 = .075" | Solids 12.3% (W) 2 venturis |

TABLE I-continued
EXAMPLES II–XXIII

| | Steam Rate lb/hr. | P psig | Particulate Rate lb/hr. | Pump Rpm | Resin Soln. T °F. | P psig | Particle Size - % 20/40/60 Mesh | Density ft.³ | % Moisture | Nozzle Dimensions | Comments |
|---|---|---|---|---|---|---|---|---|---|---|---|
| | 500+ | 168 | 195 | 52 | 245 | 230 | 12.7/32.3/28.5 19.7 fines | 11.6 | — | same | same |
| | 500+ | 170 | — | 52 | 240 | 225 | 8.6/25.0/31.2 33.9% fines | 10.6 | — | same | same |
| Ex. X | 530 | 168 | 185 | 56 | 230 | 215 | 19.6/19.5/18.5 24.3% fines | 12.1 | 0.3 | same | Solids 16% (W) |
| | 520 | 169 | 190 | 60 | 230 | 220 | 16.1/21.6/21.4 29.6% fines | 11.2 | 0.3 | same | same |
| | 520 | 168 | 215 | 63 | 235 | 245 | 13.8/16.6/19.3 23.3 fines | 12.0 | — | same | same |
| Ex. XI | 650 | 163 | — | 53 | 284 | 400 | 41.9/21.8/10.1 28.2% fines | 10.7 | 0.2 | FIG. 2 Dimens #12 = 30° #13 = .181" #15 = .210" #18 = .069" | Solids 16% (W) |
| Ex. XII | 580 | 168 | 210 | 56 | 270 | 210 | 13.6/12.9/16.6 39.8% fines | 13.7 | 0.6 | FIG. 2 Dimens #12 = 90° #13 = .181" #15 = .210" #18 = .073" | Solids 16.7% (W) |
| Ex. XIII | 550 | 170 | 250 | 67 | 250 | 290 | 20.2/29.7/26.2 18.0% fines | 13.0 | 0.2 | same | Solids 16.7% (W) |

EXAMPLES XXIV—XXVII

Various samples of polycarbonate resin particles were processed by drying polycarbonate/methylene chloride solutions utilizing steam as the hot high velocity vapor medium and a venturi nozzle having the configuration indicated in Table II, while varying the parameters of steam flow rate, holding the steam pressure relatively constant, varying the particulate flow rate and resin solution temperature and pressure. The results of density, particle size and moisture analyses performed on these samples are set forth in Table II.

stood that changes may be made in the particular embodiments of the invention described which are within the full intended scope of the invention and defined by the appended claims.

I claim:
1. A process for drying resinous materials which comprises:
   (a) forming a superheated solution of the resinous material and
   (b) spraying the superheated solution through one or more venturi shaped nozzles at high pressure.
2. A process for drying resinous materials which

TABLE II
EXAMPLES XIV–XVII

| | Steam Rate lb/hr. | P psig | Particulate Rate lb/hr. | Pump RPM | Resin Soln. T °F. | P psig | Particle Size - % 20/40/60 Mesh | Density ft.³ | % Moisture | Nozzle Dimensions | Comments (W) |
|---|---|---|---|---|---|---|---|---|---|---|---|
| Ex. XIV | 560 | 170 | 230 | 64 | 130 | 280 | 24.6/15.3/14.3 24.8% fines | 13.5 | 20 | Fig. 2 Dimens #12 = 90° #13 = .181" #15 = .190" #18 = .070" | Solids 16% (W) |
| Ex. XV | 550 | 172 | 189 | 58 | 251 | 290 | 24.1/12.4/4.1 4.7% fines | 13.8 | 13.8 | same | Solids 16% (W) |
| | 540 | 170 | 190 | 65 | 265 | 300 | 22.0/11.3/7.0 7.3% fines | 15.2 | 13.8 | same | same |
| Ex. XVI | 530 | 176 | 250 | 76 | 270 | 320 | 21.3/28.5/19.6 14.2% fines | 13.9 | 13 | same | same |
| | 525 | 175 | 253 | 75 | 268 | 330 | 20.0/24.5/16 19.1% fines | 14.7 | — | same | same |
| Ex. XXII | 520 | 170 | 255 | 77 | 290 | 345 | 20.7/30.8/19.3 22% fines | 15.2 | 7 | FIG. 2 Dimens #12 = 90° #13=.181" #15 = .190" #18 = .070" | Solids 16% (W) |
| | 460 | 170 | 266 | 81 | 295 | 380 | 21.3/29.9/22.3 15.1% fines | 13.8 | 10 | same | same |

Although the above examples show various modifications of the present invention and a portion of the present invention has been explained by a detailed description of a specific embodiment, it is understood that various modifications and substitutions are possible in light of the above teachings. It is, therefore, to be under-comprises:
(a) forming a superheated solution of a resinous material and
(b) injecting the superheated solution at high pressure at an inlet point located at the throat of one or more venturi shaped nozzles into a high velocity stream of hot gas or vapor.

3. The process of claim 2 wherein the resinous material is a polycarbonate resin.

4. The process of claim 3 wherein the superheated solution is a solution of a polycarbonate resin in methylene chloride.

5. The process of claim 4 wherein the hot high velocity vapor is steam.

6. The process of claim 5 wherein the steam is saturated.

7. The process of claim 2 wherein the superheated solution of resinous material is injected at a pressure of up to 325 psig into the throat of one or more venturi shaped nozzles at an angle of 90° with relation to the direction of flow of the hot high velocity vapor.

8. The process of claim 2 wherein the superheated solution of resinous material is injected at a pressure from about 325–3000 psig into the throat of one or more venturi shaped nozzles at an angle of less than 90° with relation to the direction of flow of the hot high velocity vapor.

9. A process for drying a polycarbonate resin which comprises:
(a) forming a superheated solution of resinous polycarbonate material in methylene chloride; and
(b) injecting the superheated solution of polycarbonate resin in methylene chloride at the throat of one or more venturi shaped nozzles and into a stream of saturated steam which is passing through said venturi shaped nozzles, wherein the said superheated solution of polycarbonate resin is injected at an angle of about 30° with relation to the direction of flow of the said saturated steam.

* * * * *

UNITED STATES PATENT OFFICE
CERTIFICATE OF CORRECTION

Patent No. 4,209,912        Dated July 1, 1980

Inventor(s) Henry P. Barker

It is certified that error appears in the above-identified patent and that said Letters Patent are hereby corrected as shown below:

Column 3, line 2, "very" should read --vary--.

Columns 3-4, TABLE I, fourth heading, "Pump Rpm" should read --Pump RPM--.

*Signed and Sealed this*

*Twenty-third* Day of *December 1980*

[SEAL]

*Attest:*

SIDNEY A. DIAMOND

*Attesting Officer*  *Commissioner of Patents and Trademark*